United States Patent Office 2,850,520
Patented Sept. 2, 1958

2,850,520

NEW WATER-INSOLUBLE STYRYL DYESTUFFS

Ernest Merian, Bottmingen, Bruno J. R. Nicolaus, Basel, and Otto Senn, Arlesheim, Switzerland, assignors to Sandoz A. G., Basel, Switzerland, a Swiss firm No Drawing. Application July 12, 1957
Serial No. 671,420

Claims priority, application Switzerland July 18, 1956

7 Claims. (Cl. 260—465)

The present invention relates to new water-insoluble styryl dyestuffs which correspond to the formula

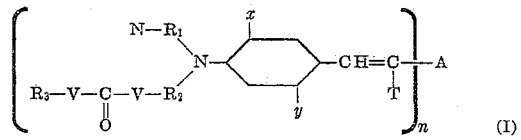

(I)

wherein A represents the cyano radical, or a carbalkoxy radical, or a benzene-, diphenyl-, naphthalenemono- or -disulfonyl radical which may be substituted by halogen atoms or alkyl groups containing less than 6 carbon atoms, or a 1,3,3-trimethylindolium radical combined in the 2 or 4 position and further substituted if desired, $x$ hydrogen, a methyl, ethyl, methoxy or ethoxy radical, $y$ hydrogen, a methyl, ethyl, methoxy or ethoxy radical or, when A stands for a 1,3,3-trimethylindolium radical, also halogen or the trifluoromethyl radical, $R_1$ an alkylene radical with 1 to 4 carbon atoms, $R_2$ an alkylene radical with 2 to 4 carbon atoms, $R_3$ an aliphatic, cycloaliphatic or aromatic radical which is free from water-solubilizing groups and may be further substituted, one V oxygen and the other V the imino group, M hydrogen, a low molecular alkyl or alkoxy radical or, when A stands for a 1,3,3-trimethylindolium radical, the cyanomethyl, difluoromethyl or trifluoromethyl radical, a carbalkoxy radical, or the $R_3$—V—CO—V radical in which $R_3$ and V possess the aforenamed meanings, T hydrogen, when A stands for a 1,3,3-indolium radical, and the cyano radical, when A has another meaning, and $n$ the number 1 or 2.

Especially interesting dyestuffs are those which correspond to the formula

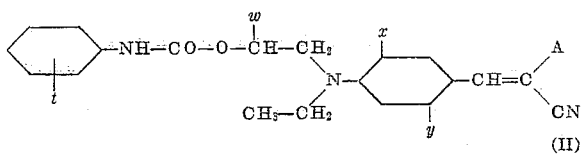

(II)

wherein each of $x$, $y$, $w$ and $t$ represents hydrogen or methyl, and A represents the cyano radical, a carbalkoxy radical containing less than 8 carbon atoms, a phenylsulfonyl radical which may carry halogen atoms or alkyl groups with less than 6 carbon atoms, a tetrahydronaphthylsulfonyl or a naphthylsulfonyl radical, or to the formula wherein each of $x$, $w$ and $t$ represents hydrogen or methyl, $y$ represents hydrogen, chlorine, bromine, methyl or trifluoromethyl, M represents cyano, difluoromethyl or trifluoromethyl, and $v$ represents hydrogen, chlorine or nitro.

The process for the production of the new water-insoluble styryl dyestuffs consists in condensing 1 or 2 moles respectively of an aldehyde free from water-solubilizing groups and having the formula

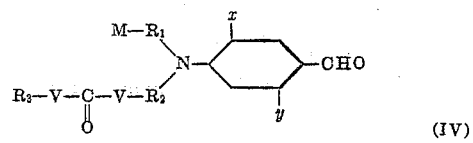

(IV)

wherein $x$, $y$, $R_1$, $R_2$, V and M possess the meanings previously recited, with 1 mol of malonic acid dinitrile or of a cyanoacetic acid alkyl ester or a benzenesulfonyl or diphenylsulfonyl acetonitrile or a naphthalenemonosulfonyl or naphthalenedisulfonyl acetonitrile, which may be further substituted by halogen atoms or alkyl groups having less than 6 carbon atoms, or a 1,3,3-trimethyl-2-methyleneindoline which may contain further substituents.

Examples of cyanoacetic acid alkyl esters conforming to the present definition are the methyl, ethyl, propyl, isopropyl, butyl, isobutyl, tert.butyl, -2-methoxyethyl, -2-ethoxyethyl, -3-methoxypropyl, -3-ethoxypropyl, -3-methoxybutyl, and -3-ethoxybutyl esters. Suitable compounds containing the acetonitrile radical are phenylsulfonylacetonitrile, chloro-, dichloro, methyl-, ethyl-, isopropyl-, tert.butyl- and dimethylphenylsulfonylacetonitrile, naphthyl-, isopropylnaphthyl- and diphenyldisulfonylacetonitrile. Among the 1,3,3-trimethyl-2-methyleneindolines, the 1,3,3-trimethyl-2-methyleneindoline itself, the 1,3,3-trimethyl-2-methylene-5-chloroindoline and the 1,3,3-trimethyl-2-methylene-5-nitroindoline merit special mention.

The reaction of the aldehyde with the active methylene compound is performed advantageously by causing the aldehyde to act upon the said compound at fairly high temperature in homogeneous solution in an organic solvent and in presence of a small quantity of a basic substance, e. g. ammonia, dimethylamine, diethylamine, piperidine, sodium alcoholate or potassium alcoholate.

It is also possible to heat a mixture of the above-mentioned reactants in presence of glacial acetic acid or another organic acid plus a proton acceptor such as ammonia, diethylamine, dimethylamine or piperidine and, if desired, a solvent like benzene, toluene, xylene, chloroform or carbontetrachloride, acting as a recycling agent. The water of reaction is continuously drained off so that there is a constant shift in the equilibrium position to the side of the condensation product.

Condensation can also be conducted by saturating a homogeneous solution of the two reactants in a suitable solvent with dry hydrogen chloride. This procedure gives rise to a hydrogen chloride addition product, which upon distilling or heating with tertiary bases such as dimethylaniline or diethylaniline splits off the hydrogen chloride to yield the desired ethylidene compound.

Finally, condensation can be carried out by melting together the reactants and a basic catalyst such as am-

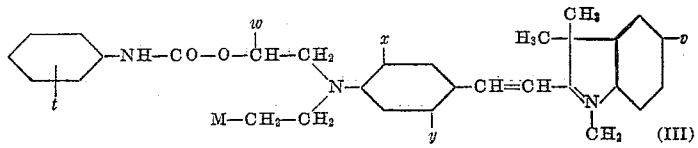

(III)

monia, dimethylamine, diethylamine, piperidine, ammonium acetate or piperidine acetate in the absence of solvent.

The dyestuffs are isolated by one of the common basic operations, e. g. filtration, evaporation of the solvent, or precipitation from the solvent with a suitable precipitating agent.

The new dyestuffs are soluble with fiber-forming polymers in organic solvents. The resulting solutions can be spun by the established methods, both wet and dry. As compared with the mass coloration of fibers with pigments, the new styryl dyestuffs present an advantage in that they do not cause clogging in the extruder or incrustation of the filters.

By virtue of their solubility in organic solvents the new styryl dyestuffs are also suitable for the mass pigmentation of oils, lacquer media and synthetic resins. A certain number of them, notably those containing a sulfonyl group, have been unexpectedly found to be applicable in the synthetic polymer melt prior to extrusion, a dyeing process employed in the manufacture of the synthetic polyamide and polyester fibers.

In this connection it is worth noting that almost all of the azo dyestuffs are destroyed under the temperature conditions obtaining in this process.

Many of the new styryl dyestuffs, especially those which do not contain a sulfonyl group, can be dyed from suspension, preferably at high temperature and in the presence of agents with dispersing action. They draw on synthetic polyamide fibers, e. g. nylon and "Perlon" (registered trademark); cellulose ester fibers, e. g. secondary cellulose acetate and cellulose triacetates; polyvinyl fibers; polyacrylonitrile fibers, e. g. "Orlon" (registered trademark); and terephthalic acid ester fibers, e. g. "Terylene," "Dacron" (registered trademarks). The dyeings are greenish yellow to red in shade. Special mention is due in this connection to the outstanding affinity for "Orlon" of those styryl dyestuffs which are obtainable from an aldehyde of Formula IV and a 1,3,3-trimethyl-2-methyleneindoline free from water-solubilizing groups but containing further substituents if desired. A number of the dyestuffs also dye wool and silk.

Applied to the above-named fibers from suspension, the dyestuffs give dyeings of very good fastness to water, washing, perspiration, sublimation, ironing, heat setting and gas fumes. The light fastness of the dyeings on polyamide fibers is good, and on the other fibers very good to outstanding.

Dyeings produced in the spinning solution or the molten mass possess good to very good fastness to light, water, washing, perspiration, cross dyeing, chlorination in alkaline medium, sublimation, oxalic acid, dry cleaning, gas fumes, rubbing, ironing, peroxide bleaching, heat setting and hydrosulfite.

In the following examples the parts and percentages are by weight. The temperatures are in degrees centigrade and the melting points are uncorrected.

EXAMPLE 1

32.6 parts of 1-[N-ethyl-N-(2'-phenylcarbamic acid ethyl ester)]-amino-3-methyl-4-benzaldehyde together with 10 parts of cyanoacetic acid methyl ester and 1 part of piperidine in 30 parts of methyl alcohol are heated to the boil with reflux.

After some time the deep yellow-colored mass is cooled to 0°, upon which the new styryl dyestuff crystallizes out in beautiful yellow needles. It is filtered off, washed with cold alcohol, and dried. It is readily soluble in ethyl acetate and acetone and melts at 122°. It dyes secondary cellulose acetate and cellulose triacetate, terephthalic acid ester fibers, polyamide and polyacrylonitrile fibers in brilliant greenish yellow shades of excellent fastness to water and sea water. The dyeings also possess high fastness to light, sublimation, gas fumes, washing, perspiration, ironing, and heat setting.

A dyebath is prepared with 0.6 part of the dyestuff obtained as described above and dispersed with Turkey-red oil, 6 parts of a sulfonated fatty alcohol and 3000 parts of water. 100 parts of secondary cellulose acetate are introduced into the bath at room temperature. The temperature is raised to 80° in 1 hour and this temperature maintained for a further hour. After this time the dyeing process is completed. The fabric is removed, rinsed and dried.

To improve its dispersibility the dyestuff can be ground prior to dyeing with suitable wetting, dispersing or emulsifying agents, preferably in the presence of inorganic salts such as Glauber's salt. It can also be intimately mixed with a dispersing agent to give an aqueous paste, which is converted into a dyestuff powder by suitable drying.

When an equal quantity of the same aldehyde is condensed in an analogous manner with 8 parts of malonic acid dinitrile, a yellow dyestuff is obtained whose melting point is 125°.

The above-mentioned 1-[N-ethyl-N-(2'-phenylcarbamic acid ethyl ester)]-amino-3-methyl-4-benzaldehyde is new and is prepared as follows:

44 parts of N,N-dimethylformamide, 120 parts of phosphorus oxychloride and 29.8 parts of 1-[N-ethyl-N-(2'-phenylcarbamic acid ethyl ester)]-amino-3-methylbenzene are heated to 60°, and this temperature held for some time. As soon as the reaction is completed, the reaction mass is poured into a mixture of 300 parts of ice and 300 parts of water with thorough stirring. The resultant suspension is adjusted to pH 6 by the addition of a 5% solution of sodium hydroxide. After some time the precipitated product is separated and dried in vacuo. It is a light colored oil which congeals after some time and melts at 88–89°.

EXAMPLE 2

32.6 parts of 1-[N-ethyl-N-(2'-phenylcarbamic acid ethyl ester)]-amino-3-methyl-4-benzaldehyde are carefully melted with 20 parts of 2-[(4'-methyl)-phenylsulfonyl]-acetonitrile and 1 part of piperidine, and the melt stirred for some time at 100°.

As soon as the reaction is completed the reaction mass is allowed to cool and then pulverized. The new styryl dyestuff thus formed can be re-crystallized from methyl alcohol, its melting point then being 145°. Its acetone-solubility is higher than 100 grams per liter. Applied in cellulose acetate and triacetate spinning solutions, the dyestuff yields brilliant greenish yellow shades which possess very good fastness properties.

100 parts of cellulose acetate are mixed for a short time with 300 parts of a solvent (93 percent acetone plus 7 percent methanol), and the mixture left overnight to swell.

0.5 part of the dyestuff obtained according to this example is dissolved in 60 parts of the solvent by simple shaking, the solution being added to the cellulose acetate spinning solution. The mixture is stirred in an open mixing vessel until 60 parts of the solvent have evaporated.

The dyed mass is pumped into the spinning pot and spun in the normal way. The dyed filament is greenish yellow in shade and exhibits excellent fastness to light, washing, cross dyeing, chlorine in alkaline medium, oxalic acid, peroxide, bleaching, gas fumes, rubbing and hydrosulfite.

EXAMPLE 3

18 parts of 1,3,3-trimethyl-2-methyleneindoline and 43 parts of 1-[N,N-di-(2'-phenylcarbamic acid ethyl ester)]-amino-3-methyl-4-benzaldehyde and 50 parts of glacial acetic acid are heated with reflux. The solution soon turns dark red in color. After some time the mass is disscharged into ice water with constant stirring, and then precipitated with common salt. A good yield of the hydrochloride of the base is obtained. The dried styryl dyestuff dissolves well in acetone and melts at 90°. It is applied to cellulose acetate and triacetate spinning solutions to give very brilliant red shades. On "Orlon" it is dyed from aqueous suspension in brilliant red shades. The dyestuff has very good fastness properties on these fibers.

When the 43 parts of 1-[N,N-di-2'-phenylcarbamic acid ethyl ester)]-amino-3-methyl-4-benzaldehyde in Example 3 is replaced by 32.6 parts of 1-[N-ethyl-N-(2'-phenylcarbamic acid ethyl ester)]-amino-3-methyl-4-benzaldehyde or by 31 parts of 1-[N-ethyl-N-(2'-phenylcarbamic acid ethyl ester)]-amino-4-benzaldehyde or by 44 parts of 1-[N,N-di-(2'-phenylcarbamic acid ethyl ester)]-amino-4-benzaldehyde respectively, three styryl dyestuffs are obtained with the melting points 44°, 60° and 101°. These products have similar dyeing properties to those described in the first paragraph of this example.

In the following Table 1 descriptive data of further valuable styryl dyestuffs are presented. They can be produced by one of the processes described in the above, and correspond to the general formula

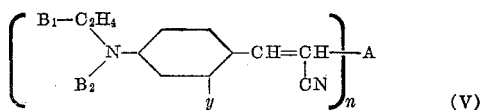

The meanings of $B_1$, $B_2$, A, y and n are given in the columns so headed. A further column contains the melting points of the dystuffs, and in the final column the shade produced in solution-dyed cellulose acetate is noted.

*Table 1*

| Ex. No. | $B_1$ | $B_2$ | A | y | n | M. P., degrees | Shade in cellulose acetate |
|---|---|---|---|---|---|---|---|
| 4 | Ethylcarbamic acid radical. | Ethyl | Cyano | Methyl | 1 | 122 | Greenish yellow. |
| 5 | ----do---- | ----do---- | Carboxymethyl | ---do---- | 1 | 155 | Do. |
| 6 | Phenylcarbamic acid radical. | Phenylcarbamic acid ethyl radical. | 4'-methylphenyl sulfonyl | ---do---- | 1 | 165 | Do. |
| 7 | ----do---- | Methyl | Cyano | Hydrogen | 1 | 142 | Do. |
| 8 | ----do---- | Ethyl | ---do---- | ---do---- | 1 | 136 | Do. |
| 9 | ----do---- | Methyl | Carboxymethyl | ---do---- | 1 | 116 | Do. |
| 10 | ----do---- | ----do---- | 4'-methylphenylsulfonyl | ---do---- | 1 | 122 | Do. |
| 11 | ----do---- | Ethyl | Phenylsulfonyl | Methyl | 1 | 142 | Do. |
| 12 | ----do---- | ----do---- | 5,6,7,8-tetrahydronaphthyl-2-sulfonyl. | ---do---- | 1 | 146 | Do. |
| 13 | ----do---- | ----do---- | 3,4-dichlorophenylsulfonyl | Methoxy | 1 | 157 | Do. |
| 14 | ----do---- | ----do---- | Cyano | ---do---- | 1 | 153 | Do. |
| 15 | ----do---- | ----do---- | 4' methylphenylsulfonyl | ---do---- | 1 | 107 | Do. |
| 16 | ----do---- | ----do---- | Carboxymethyl | ---do---- | 1 | 188 | Do. |
| 17 | ----do---- | ----do---- | Naphthyl-2-sulfonyl | Methyl | 1 | 134 | Do. |
| 18 | ----do---- | ----do---- | 4-chlorophenyl-1-sulfonyl | ---do---- | 1 | 126 | Do. |
| 19 | ----do---- | ----do---- | 1,1'-diphenyl-4,4'-disulfonyl | ---do---- | 2 | 150 | Do. |
| 20 | Carboxylic acid ethyl esterimide | ----do---- | Cyano | ---do---- | 1 | 123 | Do. |
| 21 | ----do---- | ----do---- | Carboxymethyl | ---do---- | 1 | 119 | Do. |

Table 2 contains further water-insoluble styryl dyestuffs which correspond to the formula

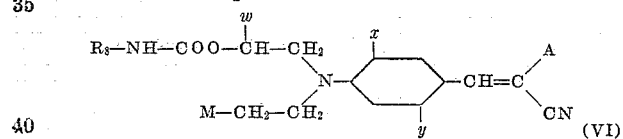

They are characterized by the symbols $R_3$, w, M, y, x and A in columns (I) to (VI) and by the shade produced in solution-dyed cellulose acetate in column (VII).

*Table 2*

| Ex. No. | (I) $R_3$ | (II) w | (III) M | (IV) y | (V) x | (VI) A | (VII) Shade in cellulose acetate |
|---|---|---|---|---|---|---|---|
| 22 | Phenyl | Methyl | Hydrogen | Methyl | Hydrogen | Cyano | Greenish yellow. |
| 23 | ---do--- | ---do--- | Methyl | ---do--- | ---do--- | ---do--- | Do. |
| 24 | ---do--- | ---do--- | Ethyl | ---do--- | ---do--- | ---do--- | Do. |
| 25 | ---do--- | ---do--- | ---do--- | ---do--- | Methyl | ---do--- | Do. |
| 26 | ---do--- | ---do--- | ---do--- | Methyl | Methoxy | ---do--- | Do. |
| 27 | ---do--- | ---do--- | ---do--- | Hydrogen | Methoxy | ---do--- | Do. |
| 28 | ---do--- | Hydrogen | Methyl | Methyl | Hydrogen | ---do--- | Do. |
| 29 | ---do--- | ---do--- | ---do--- | ---do--- | Methyl | ---do--- | Do. |
| 30 | ---do--- | ---do--- | ---do--- | ---do--- | Methoxy | ---do--- | Do. |
| 31 | ---do--- | ---do--- | Ethyl | ---do--- | ---do--- | ---do--- | Do. |
| 32 | ---do--- | ---do--- | ---do--- | Methoxy | ---do--- | ---do--- | Do. |
| 33 | ---do--- | ---do--- | Methoxy | Ethyl | Hydrogen | ---do--- | Do. |
| 34 | ---do--- | ---do--- | Ethoxy | Ethoxy | ---do--- | ---do--- | Do. |
| 35 | Ethyl | ---do--- | Hydrogen | Methyl | ---do--- | ---do--- | Do. |
| 36 | Butyl | ---do--- | ---do--- | ---do--- | ---do--- | ---do--- | Do. |
| 37 | Cyclohexyl | ---do--- | ---do--- | ---do--- | ---do--- | ---do--- | Do. |
| 38 | 4'-methylphenyl | ---do--- | ---do--- | ---do--- | ---do--- | ---do--- | Do. |
| 39 | 3'-methylphenyl | ---do--- | ---do--- | ---do--- | ---do--- | ---do--- | Do. |
| 40 | 3',4'-dimethylphenyl | ---do--- | ---do--- | ---do--- | ---do--- | ---do--- | Do. |
| 41 | Phenyl | Methyl | ---do--- | ---do--- | ---do--- | Carbomethoxy | Do. |
| 42 | ---do--- | ---do--- | ---do--- | ---do--- | ---do--- | Carbethoxy | Do. |
| 43 | ---do--- | ---do--- | ---do--- | ---do--- | ---do--- | Carbopropoxy | Do. |
| 44 | ---do--- | ---do--- | ---do--- | ---do--- | ---do--- | Carboisopropoxy | Do. |
| 45 | ---do--- | ---do--- | ---do--- | ---do--- | ---do--- | Carbobutoxy | Do. |
| 46 | ---do--- | Hydrogen | ---do--- | ---do--- | ---do--- | Carbethoxy | Do. |
| 47 | ---do--- | ---do--- | ---do--- | ---do--- | ---do--- | Carbopropoxy | Do. |
| 48 | ---do--- | ---do--- | ---do--- | ---do--- | ---do--- | Carboisopropoxy | Do. |
| 49 | ---do--- | ---do--- | ---do--- | Hydrogen | Ethyl | Cyano | Do. |
| 50 | ---do--- | ---do--- | ---do--- | ---do--- | Ethoxy | ---do--- | Do. |
| 51 | ---do--- | Methyl | Ethyl | ---do--- | Hydrogen | Carbomethoxy | Do. |
| 52 | ---do--- | ---do--- | Hydrogen | ---do--- | Ethyl | 4'-isopropylphenylsulfonyl | Do. |
| 53 | ---do--- | ---do--- | ---do--- | ---do--- | Ethoxy | 4'-chlorophenylsulfonyl | Do. |
| 54 | ---do--- | Hydrogen | ---do--- | ---do--- | Hydrogen | Carbo-isoamyloxy | Do. |
| 55 | ---do--- | ---do--- | ---do--- | ---do--- | ---do--- | Carbo-amyloxy | Do. |
| 56 | ---do--- | ---do--- | ---do--- | ---do--- | ---do--- | Carbo-(3'-methoxy)-butoxy. | Do. |
| 57 | ---do--- | ---do--- | ---do--- | ---do--- | ---do--- | Carbo-(3'-ethoxy)-butoxy. | Do. |

In Table 3 water-insoluble styryl dyestuffs are enumerated which correspond to the formula

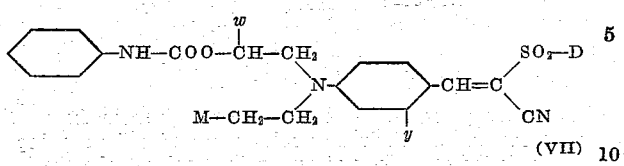

They are characterized by the symbols $w$, $y$, M and D in columns (I) to (IV) and by the shade produced in solution-dyed cellulose acetate in column (V).

In Table 4 are listed water-insoluble styryl dyestuffs of the formula

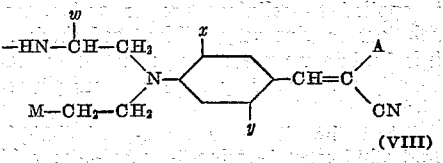

They are characterized by the symbols $R_3$, $w$, M, $y$, $x$ and A in columns (I) to (VI) and by the shade produced in solution-dyed cellulose acetate in column (VII).

Table 3

| Ex. No. | (I) w | (II) y | (III) M | (IV) D | (V) Shade in cellulose acetate |
|---|---|---|---|---|---|
| 58 | Hydrogen | Methyl | Methyl | Phenyl | Greenish yellow. |
| 59 | do | do | do | 4'-methylphenyl | Do. |
| 60 | do | do | do | 3',4'-dimethylphenyl | Do. |
| 61 | do | do | do | 4'-ethylphenyl | Do. |
| 62 | do | do | do | 4'-isopropylphenyl | Do. |
| 63 | do | do | do | 4'-tert.butylphenyl | Do. |
| 64 | do | do | do | 4'-chlorophenyl | Do. |
| 65 | do | do | do | Naphthyl-2' | Do. |
| 66 | do | do | do | 5',6',7',8'-tetrahydronaphthyl-2 | Do. |
| 67 | Methyl | do | do | Phenyl | Do. |
| 68 | do | do | do | 4'-methylphenyl | Do. |
| 69 | do | do | Ethyl | Phenyl | Do. |
| 70 | do | do | do | 4'-methylphenyl | Do. |
| 71 | do | do | do | 4'-chlorophenyl | Do. |
| 72 | Hydrogen | do | do | Phenyl | Do. |
| 73 | do | do | do | 4'-methylphenyl | Do. |
| 74 | Methyl | do | Hydrogen | Phenyl | Do. |
| 75 | do | do | do | 4'-methylphenyl | Do. |
| 76 | Hydrogen | do | do | 3',4'-dimethylphenyl | Do. |
| 77 | do | do | do | 4'-tert. butylphenyl | Do. |
| 78 | do | Hydrogen | do | Phenyl | Do. |
| 79 | do | do | do | 4'-methylphenyl | Do. |
| 80 | Methyl | do | do | Phenyl | Do. |
| 81 | do | do | do | 4'-methylphenyl | Do. |
| 82 | do | do | Methyl | Phenyl | Do. |
| 83 | do | do | do | 4'-methylphenyl | Do. |
| 84 | Hydrogen | do | do | do | Do. |
| 85 | do | do | do | Phenyl | Do. |
| 86 | do | do | Ethyl | do | Do. |
| 87 | do | do | Methyl | 5',6',7',8'-tetrahydronaphthyl-2' | Do. |
| 88 | do | do | Ethyl | 4'-methylphenyl | Do. |
| 89 | Methyl | do | do | do | Do. |
| 90 | do | do | do | Phenyl | Do. |
| 91 | Hydrogen | Methyl | Hydrogen | 1',1''-diphenyl-4' | Do. |

Table 4

| Ex. No. | (I) R₃ | (II) w | (III) M | (IV) y | (V) x | (VI) A | (VII) Shade in cellulose acetate |
|---|---|---|---|---|---|---|---|
| 92 | Phenyl | Hydrogen | Hydrogen | Methyl | Hydrogen | Cyano | Greenish yellow. |
| 93 | do | do | Methyl | do | do | do | Do. |
| 94 | do | do | Ethyl | do | do | do | Do. |
| 95 | do | do | do | Hydrogen | Methoxy | do | Do. |
| 96 | do | do | do | do | Methyl | Methoxy | do | Do. |
| 97 | do | do | Methyl | do | do | do | Do. |
| 98 | do | do | do | do | Methyl | do | Do. |
| 99 | do | Hydrogen | Ethyl | do | Hydrogen | Carbomethoxy | Do. |
| 100 | do | do | do | do | do | Carbethoxy | Do. |
| 101 | do | do | do | do | do | Carbopropoxy | Do. |
| 102 | do | do | do | do | do | Carbo-isopropoxy | Do. |
| 103 | do | do | Hydrogen | do | do | Phenylsulfonyl | Do. |
| 104 | do | do | do | do | do | 4'-methylphenylsulfonyl | Do. |
| 105 | do | do | do | do | do | 3',4'-dimethylphenylsulfonyl | Do. |
| 106 | do | do | do | do | do | 4'-ethylphenylsulfonyl | Do. |
| 107 | do | do | do | do | do | 4'-isopropylphenylsulfonyl | Do. |
| 108 | do | do | do | do | do | 4'-tert butylphenylsulfonyl | Do. |
| 109 | do | do | do | do | do | 4'-chlorophenylsulfonyl | Do. |
| 110 | do | do | do | do | do | Naphthyl-2'-sulfonyl | Do. |
| 111 | do | do | do | do | do | 5',6',7',8' - tetrahydronaphthyl - 2' - sulfonyl | Do. |
| 112 | Methyl | do | do | do | do | 4'-methylphenylsulfonyl | Do. |
| 113 | Ethyl | do | do | do | do | do | Do. |
| 114 | 3'-methoxybutyl | do | do | do | do | do | Do. |
| 115 | Ethoxyethyl | do | do | do | do | do | Do. |

The water-insoluble styryl dyestuffs of Table 5 correspond to the formula

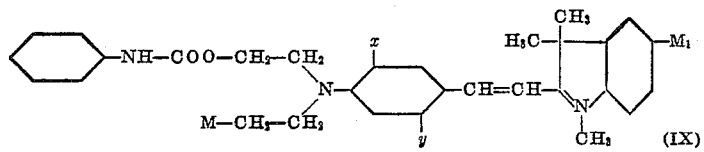

and are characterized by the symbols M, y, x and $M_1$ in columns (I) to (IV) and by the shade produced in solution-dyed cellulose acetate in column (V).

Table 5

| Ex. No. | (I) M | (II) y | (III) x | (IV) $M_1$ | (V) Shade in cellulose acetate |
|---|---|---|---|---|---|
| 116 | Hydrogen | Hydrogen | Methyl | Hydrogen | Red. |
| 117 | do | Methyl | do | do | Bluish red. |
| 118 | do | Methoxy | do | do | Do. |
| 119 | do | Methyl | Methoxy | do | Do. |
| 120 | do | Methoxy | do | do | Do. |
| 121 | do | Chloro | Hydrogen | do | Scarlet |
| 122 | do | Bromo | do | do | Do. |
| 123 | do | Trifluoromethyl | do | do | Do. |
| 124 | Methoxy | Methyl | do | do | Red. |
| 125 | Ethoxy | do | do | do | Do. |
| 126 | Cyano | do | do | do | Do. |
| 127 | Difluoromethyl | do | do | do | Scarlet. |
| 128 | Trifluoromethyl | do | do | do | Do. |
| 129 | Carbomethoxy | do | do | do | Do. |
| 130 | Phenylcarbamid. | do | do | do | Red. |
| 131 | Hydrogen | do | do | Chloro | Do. |
| 132 | do | Hydrogen | do | do | Do. |
| 133 | do | do | do | Nitro | Do. |
| 134 | do | Methyl | do | do | Do. | columns (I) to (IV) and by the shade produced in solution-dyed cellulose acetate in column (V).

Table 6

| Ex. No. | (I) w | (II) M | (III) x | (IV) A | (V) Shade in cellulose acetate |
|---|---|---|---|---|---|
| 135 | Hydrogen | Hydrogen | Hydrogen | 1,1'-diphenylyl-4,4' | Greenish yellow. |
| 136 | Methyl | do | do | do | Do. |
| 137 | do | Methyl | do | do | Do. |
| 138 | do | Ethyl | do | do | Do. |
| 139 | Hydrogen | do | do | do | Do. |
| 140 | do | Methyl | do | do | Do. |
| 141 | do | Hydrogen | do | Naphthylene-1.5. | Do. |
| 142 | Methyl | do | do | do | Do. |
| 143 | do | do | Methyl | do | Do. |
| 144 | do | do | Methoxy | do | Do. |
| 145 | Hydrogen | do | do | Naphthylene-2.6. | Do. |
| 146 | do | do | Methyl | do | Do. |
| 147 | do | do | Methoxy | do | Do. |
| 148 | Methyl | do | do | do | Do. |
| 149 | do | do | Hydrogen | do | Do. |
| 150 | Hydrogen | do | do | do | Do. |

EXAMPLE 151

200 parts of cellulose triacetate, 5 parts of the dyestuff obtained according to Example 10 which has the formula ![formula]

927 parts of methylene chloride and 49 parts of ethanol are compounded to a homogeneous paste. This is pumped into the spinning pot in the normal way and spun. The filament is dyed a bright greenish yellow which possesses excellent fastness properties.

EXAMPLE 152

A solution composed of 400 parts of polyethylene, 4 parts of the dyestuff of the formula ![formula]

The water-insoluble styryl dyestuffs of Table 6 have the formula

![formula (X)]

and are characterized by the symbols w, M, x and A in which is obtained according to Example 11, and 600 parts of xylene is extruded through orifices of 0.5 mm. diameter into mixtures of butyl alcohol and butylphthalate. The precipitated greenish yellow filament is washed in petroleum ether and dried in warm air.

EXAMPLE 153

1 part of the dyestuff of the formula

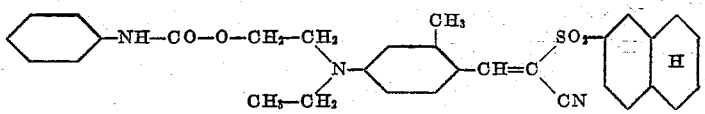

obtained according to Example 12 and 150 parts of polyvinyl chloride are dissolved in 849 parts of cyclohexanone at 80°. The hot solution is then spun into a precipitation bath of 500 parts of cyclohexanone and 9500 parts of 2-ethylhexanone at 30°. The greenish yellow filament is reeled, dried under tension, and orientated.

EXAMPLE 154

2 parts of the dyestuff of the formula

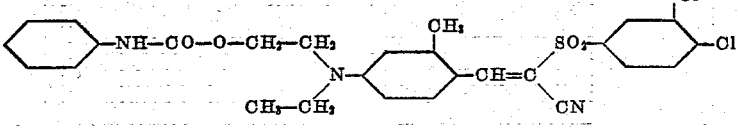

obtained according to Example 13, 280 parts of postchlorinated polyvinyl chloride and 10 parts of diethyl sulfide are dissolved in 708 parts of acetone at 40°. The mass is pumped into the spinning pot and spun in the normal way. The filament is precipitated by water, orientated and dried at 40 to 70°. It is dyed in a greenish yellow shade.

EXAMPLE 155

A mixture of 1 part of the dyestuff of the formula

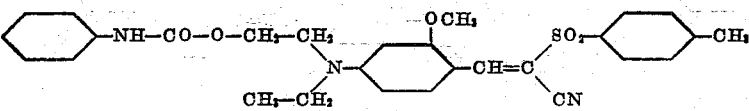

obtained according to Example 15 and 199 parts of a copolymer composed of 60.1% of vinyl chloride and 39.9% of acrylonitrile are mixed with 800 parts of acetone for 4 hours at 50°. A homogeneous yellow solution is obtained, which is filtered and spun into filament, using water as precipitating agent. The filament is orientated and heat-set in boiling water. It is dyed a greenish yellow shade with good fastness properties.

EXAMPLE 156

165 parts of polyacrylonitrile and 1 part of the dyestuff obtained according to Example 17 and having the formula

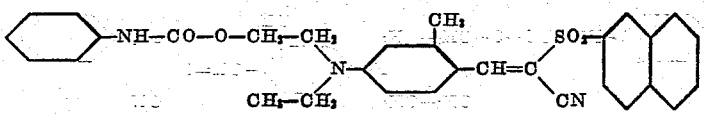

are dissolved in 834 parts of dimethylformamide at 100°. The mass is spun into filament by the extrusion method commonly used for viscose rayon, water being used as precipitating agent. The filament is subsequently orientated in a water bath at 90°. It is dyed in a bright yellow shade which shows good fastness properties.

EXAMPLE 157

1 part of the dyestuff of the formula

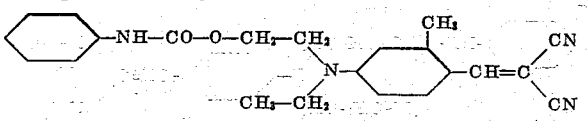

and 179 parts of polyacrylonitrile are dissolved in 820 parts of dimethylformamide at 100°. The resultant paste is pumped through the spinnerette into a precipitating bath of glycol at 140°. The filament is reeled, orientated, washed with water to remove the retained glycol, and finally dried. Greenish yellow dyeings with good fastness properties are obtained.

EXAMPLE 158

25 parts of the dyestuff of the formula which is obtained as specified in Example 1 are mixed with 5000 parts of Rilsan and the mixture melted in a nitrogen atmosphere at 230° by the normal method. The thick liquid mass is spun into greenish yellow filaments with good fastness properties.

EXAMPLE 159

25 parts of the dyestuff of the formula

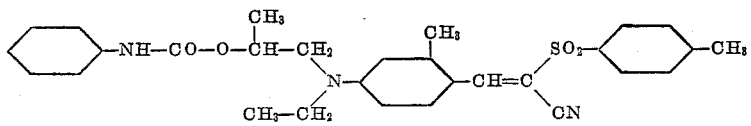

are mixed with 5000 parts of nylon (nylon 66) and the mixture melted by the normal method in a nitrogen atmosphere at about 285°. Upon spinning, the thick liquid mass yields greenish yellow filaments with good fastness properties. The filament can be orientated and/or crimped and heat-set to render it shrinkproof.

EXAMPLE 160

25 parts of the dyestuff of the formula

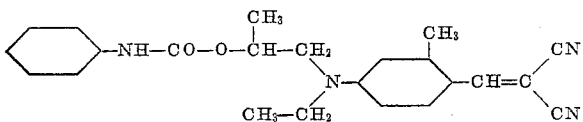

are mixed with 5000 parts of the condensate of terephthalic acid and glycol or the dimethyl ester of this acid and glycol. The mixture is melted in the normal way in a nitrogen atmosphere at about 280°, giving a thick liquid mass which is spun into greenish yellow filaments which exhibit good fastness properties.

EXAMPLE 161

1 part of the dyestuff

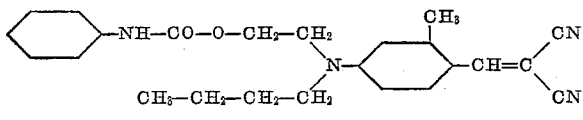

is mixed with 300 parts of polyethylene and spun by the normal extrusion method. Bright greenish yellow filaments or bristles are obtained. Polystyrene can be solution-dyed with this dyestuff on similar lines.

EXAMPLE 162

0.5 part of the dyestuff of the formula

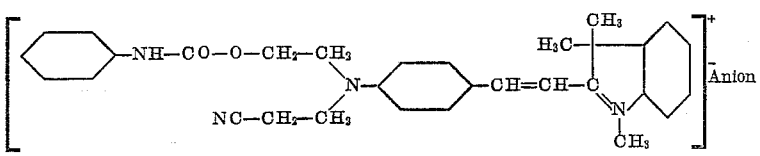

is added to 100 parts of cellulose acetate and the mixture spun according to the procedure given in Example 2. Bright red filaments of very good fastness are obtained. When the cyanoethyl group in this dyestuff is replaced by the trifluoroethyl group, the resultant dyestuff yields a rather more yellowish shade in cellulose acetate fibers, though the standard of fastness is the same. When in place of the unsubstituted aniline derivative the derivative which contains a methyl group in the m-position to the tertiary amino group is employed, the dyestuffs so obtained are a slightly more pronounced bluish red, both in substance, in solution, and in the fiber. Similar properties are possessed by the corresponding N-difluoroethylamino dyestuffs and the dyestuffs which in place of the phenylcarbamic acid ethyl radical carry the phenylcarbamic acid isopropyl radical. The latter-named dyestuffs are also well suited for the mass dyeing of cellulose acetate fibers in red shades.

Formulae of representative dyestuffs of the foregoing examples are:

EXAMPLE 1

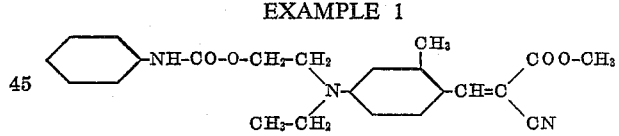

and its variant of paragraph 3

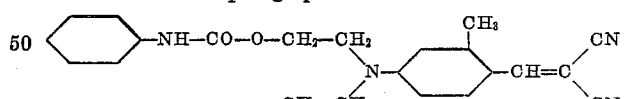

EXAMPLE 2

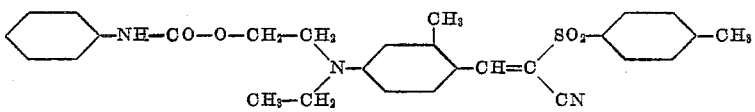

EXAMPLE 3

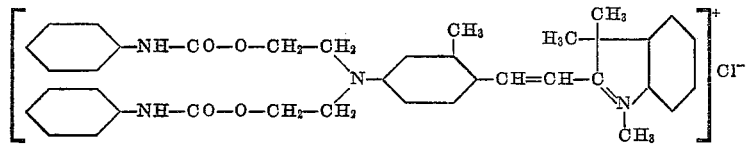

EXAMPLE 11

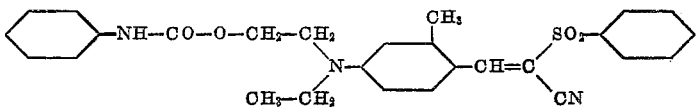

EXAMPLE 12

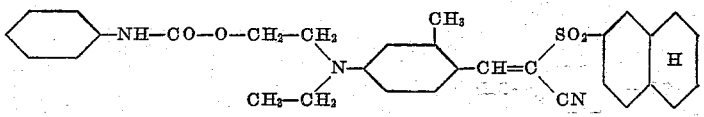

EXAMPLE 22

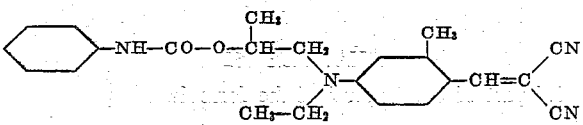

Having thus disclosed the invention what is claimed is:

1. A water-insoluble styryl dyestuff which corresponds to the formula

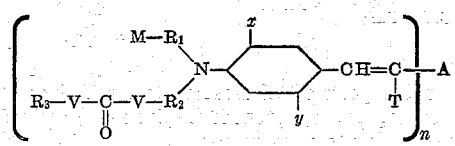

wherein A represents a member selected from the group consisting of the cyano radical, a carbalkoxy radical containing less than 8 carbon atoms, an arylsulfonyl radical containing less than 14 carbon atoms, an arylsulfonyl radical containing less than 14 carbon atoms and substituted by chlorine, the unsubstituted 1,3,3-trimethylindolium radical combined in the 2-position, the 1,3,3-trimethyl-5-chloroindolium radical combined in the 2-position, and the 1,3,3-trimethyl-5-nitroindolium radical combined in the 2-position, $x$ represents a member selected from the group consisting of hydrogen, methyl, methoxy, ethyl and ethoxy, $y$ represents a member selected from the group consisting of hydrogen, methyl, methoxy, ethyl and ethoxy, and, when A stands for a 1,3,3-trimethylindolium radical, also bromine, chlorine and trifluoromethyl, $R_1$ represents an alkylene radical with 1 to 4 carbon atoms, $R_2$ represents an alkylene radical with 2 to 4 carbon atoms, $R_3$ represents a member selected from the group consisting of a lower aliphatic, a cycloaliphatic, an unsubstituted and a methyl substituted mononuclear aromatic radical free from water-solubilizing groups, one V represents an oxygen atom and the other V the imino group, M represents a member selected from the group consisting of hydrogen, lower alkyl, lower alkoxy and, when A stands for a 1,3,3-trimethylindolium radical, also cyanomethyl, difluoromethyl, trifluoromethyl, carbalkoxy and $R_3$-V-CO-V in which $R_3$ and V possess the aforenamed meanings, T represents hydrogen, when A stands for a 1,3,3-trimethylindolium radical, and the cyano radical, when A has another meaning, and $n$ represents one of the integers 1 and 2.

2. A water-insoluble styryl dyestuff which corresponds to the formula

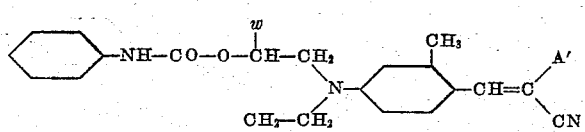

wherein $w$ represents a member selected from the group consisting of hydrogen and methyl, and $A'$ represents a member selected from the group consisting of the cyano radical, the phenylsulfonyl, the 4-methylphenylsulfonyl and the 5,6,7,8-tetrahydronaphthyl-2-sulfonyl radical.

3. The water-insoluble styryl dyestuff which corresponds to the formula

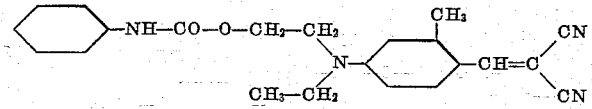

4. The water-insoluble styryl dyestuff which corresponds to the formula

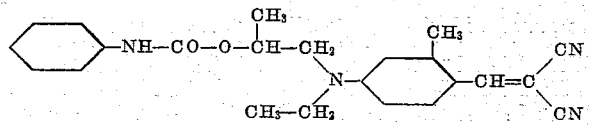

5. The water-insoluble styryl dyestuff which corresponds to the formula

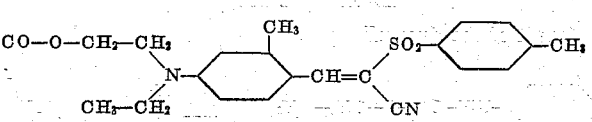

6. The water-insoluble styryl dyestuff which corresponds to the formula

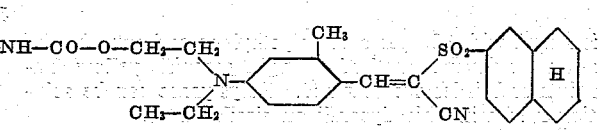

7. The water-insoluble styryl dyestuff which corresponds to the formula

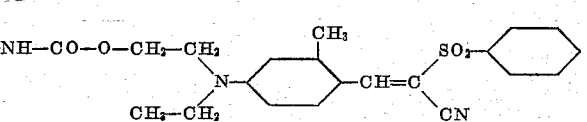

References Cited in the file of this patent

UNITED STATES PATENTS 2,226,054     Felix et al.     Dec. 24, 1940
2,583,551     Dickey et al.     Jan. 29, 1952

UNITED STATES PATENT OFFICE
Certificate of Correction

September 2, 1958

Patent No. 2,850,520    Ernest Merian et al.

It is hereby certified that error appears in the printed specification of the above numbered patent requiring correction and that the said Letters Patent should read as corrected below.

Column 1, lines 19 to 24, formula (I), for that portion of the formula reading 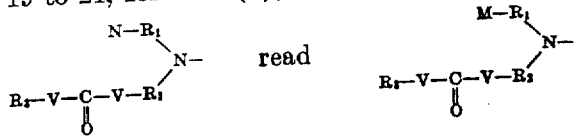 column 6, line 10, for "dystuffs" read —dyestuffs—.

Signed and sealed this 28th day of April 1959.

[SEAL]

Attest:
T. B. MORROW,
*Attesting Officer.*

ROBERT C. WATSON,
*Commissioner of Patents.*